United States Patent Office 3,436,152
Patented Apr. 1, 1969

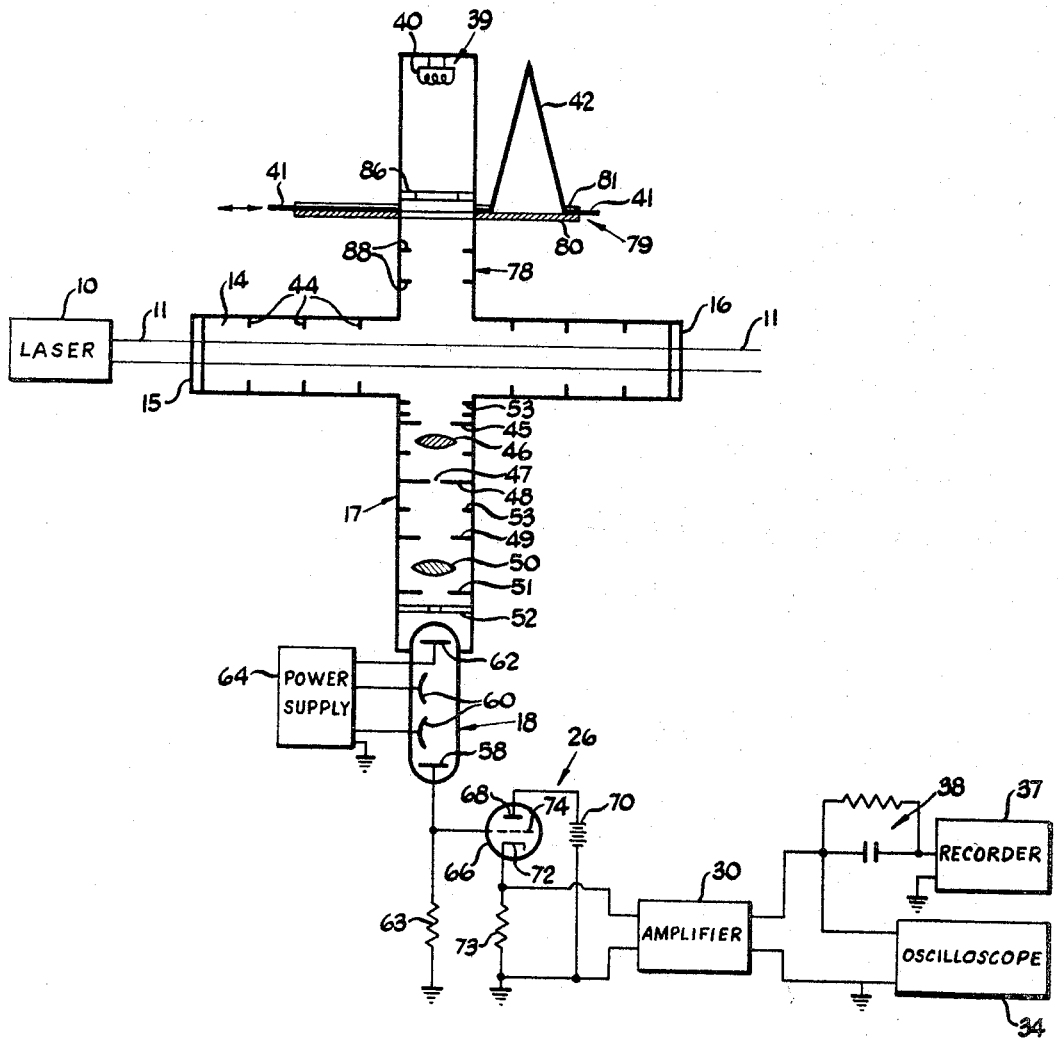

3,436,152
METHOD AND APPARATUS FOR MEASURING THE POWER IN A LIGHT BEAM
Dinsdale M. J. Compton, Del Mar, and Herschel R. Snodgrass, La Jolla, Calif., assignors, by mesne assignments, to Gulf General Atomic Incorporated, San Diego, Calif., a corporation of Delaware
Filed Mar. 31, 1965, Ser. No. 444,319
Int. Cl. G01j 1/00; G01n 21/26; H01s 3/00
U.S. Cl. 356—104    8 Claims

ABSTRACT OF THE DISCLOSURE

A method and apparatus for measuring the power in an intense light beam such as a laser beam are provided. The beam is directed through a gas having known light scattering properties so as to scatter a small fixed proportion of the beam. A detector detects a predetermined portion of the scattered light to provide an indication of the beam power. A standard light source is used to produce a comparison signal to give an absolute measurement of the beam power.

---

The present invention relates to measurement of the power in an intense beam of light, and more particularly, is directed to an improved method and apparatus for obtaining an absolute measurement of the output power in a beam of light emanating from a laser.

Basically, the optical maser, also called a laser, is a device utilizing the principle of stimulated emission to provide a source of coherent light of very high intensity. The material of which a laser is made is a substance that has a pair of energy levels between which transitions are possible. By a process known as "pumping," the population of the higher energy level is made greater than that of the lower level by excitation by energizing radiation. When the population of the upper state is higher than that of the lower state, the process of stimulated emission can occur. With the laser thus pumped, a photon traveling in the laser material stimulates the emission of another photon until a photon cascade is built up in which the photons are coherent; that is, they are of the same phase and travel in the same direction. This cascade of photons is then emitted from the laser material in an intense coherent beam.

It is well known that a beam of light from a conventional laser is very highly directional with extremely little divergence. Thus, power which is fed into a laser may be transmitted over substantial distances with comparatively little divergence loss. Moreover, the output beam of light can be focused on a small spot producing extremely high power densities. Such high intensity power may be used, for example, to vaporize various materials, to burn holes through thin steel, and for a variety of other striking effects.

It is often desirable to measure the power output of a laser; however, the power output of a laser can be so high that it is difficult to measure. The primary reason for this difficulty is the fact that presently available light measuring instruments are simply not designed to be used in conjunction with the enormous light intensities which may be produced by laser devices and are damaged or destroyed thereby. For example, attempts to measure the intensity of a laser light beam impinging on the surface of an absorbing material fail because the light beam emitted by a high powered laser can have sufficient power to raise the temperature on the surface of the absorbing material to the vaporization point. This effect is not overcome even if a highly reflective surface is utilized, due to the finite penetration depth of light in a material.

The present invention involves scattering a small portion of the beam of light into a detector, which produces a corresponding electrical signal and recording the resulting signal as with the aid of an oscilloscope. Utilization of such a method may require electronic equipment capable of a very fast response time ($5 \times 10^{-9}$ seconds or better).

There are photoelectric devices available which yield $10^{-9}$ seconds rise times, but the sensitivity of such a photoelectric device is far too high for making a direct reading of the output of a high intensity laser. If such a measurement were attempted, the photocathode of the device would be instantly damaged or ablated at the high power levels used. Thus, the present invention contemplates the use of means for reducing the intensity of the laser beam to a tolerable level as it reaches the photoelectric device. It may readily be appreciated that the amount of reduction required is quite large since the maximum continuous input for many typical high current phototubes is approximately $1/100$ of a watt, while the beam power of even present day high-power lasers may be as high as 100 to 1000 megawatts. For such conditions, reduction in power by a factor of $10^9$ to $10^{11}$ is required. Even greater reduction is frequently desirable. While it might under some conditions be possible to absorb nearly all the light so that only a minute fraction is transmitted to the phototube, damage or ablation of the absorbers makes this difficult.

In accordance with the present invention, the reduction of the beam is effected by scattering a small portion out of the beam so that nearly all of the beam is transmitted, but the required small fraction of the light is directed to the phototube. This method permits the continued use of the laser beam during the actual measurement operation itself. Thus, the effects produced may be simultaneously observed and measured, and suitable calibration methods may be employed.

The present invention utilizes the phenomenon of scattering of light by a gas. For example, Rayleigh scattering by a gas such as dry air will direct aproximately $10^{-10}$ of a beam of light into a photocell set normal to the beam, when suitable geometric arrangements are employed. This scattering procedure is fast, and the scattered light is detected by a suitable detecting means such as a photocell or photomultiplier having a $10^{-9}$ second response.

The over-all sensitivity of the device can be changed over a wide range by changing the photodetecting means, the nature of the gas, the gas pressure, or the geometric arrangement. The instantaneous output may be displayed on a suitable oscilloscope or alternatively may be electronically integrated, as by the use of an R-C integrating circuit, to yield the total energy output in one primary laser pulse.

Further, in accordance with the present invention the device may be calibrated by utilizing a self-contained standard light source.

Accordingly, it is a primary object of the present invention to provide a suitable device for measuring the power in a beam of light of very high intensity, particularly that emitted by a laser.

Another object of the present invention is the provision of a laser output measuring device which may be readily calibrated in an absolute fashion.

It is another object of the present invention to provide a laser output measuring device having high absolute accuracy and speed of measurement.

It is still a further object of the present invention to provide a laser output measuring device which is compact and durable and does not interfere with the normal use of the over-all laser system.

Other objects and advantages of the present invention will become apparent from the following detailed description when considered in conjunction with the accompanying drawings wherein:

The figure is an illustration, partly diagrammatic, of a laser output measuring device in accordance with the present invention.

The measuring device as shown in the drawing is shown disposed adjacent a laser 10, which acts as a source of high intensity light. The laser 10, in addition to the laser material itself, includes all of the means necessary for the production of a beam 11 of coherent light. The measuring device includes an elongated enclosure 14 which has a pair of aligned windows 15 and 16 at opposite ends thereof through which the light beam emitted by the laser passes. An arm 17 forms part of the enclosure and, in the form of the invention shown in the drawing extends normal to the path of travel of the laser beam 11. At the end of the arm is disposed a suitable detection means 18 such as a multiplier phototube. The enclosure 14 is filled with gas, the nature of which is described further below.

As the laser beam travels through the gas in the enclosure, a very minute fraction of the beam is scattered out of the beam toward the multiplier phototube 18. The output of the mutliplier phototube 18 is supplied to a cathode follower circuit 26. A suitable fast amplifier 30 is connected to the output of the cathode follower and transfers the amplified signal to a high speed oscilloscope 34. An integrator circuit 38 is also shown connected to the output of the fast amplifier 30, so as to obtain a direct measure of the total light output in one pulse of the laser 10. The integrated signal may then be recorded on a recorder 37.

In addition, it is desirable to check the sensitivity of the phototube 18 frequently, so as to keep the measuring apparatus properly calibrated. Thus, a calibration means 39, including a standard lamp, or light source 40, is provided. The calibration means 39 is preferably rigidly mounted on a selectively movable flat plate 41 so that it may be conveniently replaced by a light trap 42, which is similarly mounted on the plate 41, after calibration of the device has been completed.

The laser 10 may be of a typical variety such as of ruby. As noted above, the laser 10 includes the laser material itself and the other associated means for producing the laser beam 11. The laser material may be mounted in an optical cavity which may be in the form of a typical Fabry-Perot interferometer. In the commonest mode of laser operation, pulses of light are emitted rather than continuous waves. These pulses are supplied in a pulsed beam through the window 15 of the enclosure 14. The beam of light 11 passes through the enclosure and out through the window 16 disposed at the opposite end of the enclosure 14.

Various gas fillings are suitable. The most important factor in the selection of a proper gas is the avoidance of resonances. Resonance occurs when the frequency of the light beam emited by the laser coresponds to a transition state in the atoms or molecules of the particular gas employed. When resonance occurs, scattering is greatly increased and varies greatly with small changes of frequency of the light beam, thus affecting the accuracy of measurement. Further the gas should be kept free of dust particles so as to avoid scattering of the light beam by such particles, for such additional scattering of the light would cause a change from the constant fraction scattered by the gas. The gas should be kept free of droplets of oil or water for similar reasons. It is preferable to use either appropriately filtered dry air or an inert gas as the scattering medium. The advantages of dry air are its ready availability and the fact that its scattering coefficient is known over a wide range of wave lengths to a considerable degree of accuracy. However, various inert gases also have distinct advantages. In a sealed system they do not tend to disapear like oxygen, and they are less likely to give rise to possible non-linear effects or ionization effects at the high power intensities in a laser beam. Further, the molecules of the inert gases are spherical and thus permit easy calculation of their scattering properties. An inert gas such as helium is a preferable medium for use in the present invention.

The process of scattering of a beam of light by a gas is a well-known physical phenomenon. The scattering properties of various gases are well known. The type of gas used affects the degree of scattering due to differences in molecular structure, etc. The degree of scattering which is achieved is also dependent on a variety of parameters. Scattering is proportional to the pressure or density of the gas. The length of the path of the light beam viewed by the detector as well as the solid angle subtended thereby are also important parameters, the detected light being approximately proportional to each. The scattering also depends upon the angle at which it is observed.

It has been found advantageous to employ a detection means set normal to the path of travel of the light beam to be scattered. The scattering properties of gases in this direction are particularly well known and the attendant calculations are simplified. Further, with the detected light being scattered as far as possible out of the direction of the beam, the detector is less sensitive to stray light entering the enclosure 14 through the windows 15 and 16. Further, a plurality of light baffles 44 are shown disposed along the interior walls of the enclosure 14. These light baffles include light absorbing surfaces, as of lamp black, and serve to eliminate the effects of stray light and internal reflection. They absorb substantially all of the light entering the enclosure 14 through one of the windows 15, 16 other than that traveling in the direction of the other windows. This makes the device selectively sensitive to the entering laser beam, which is directional, while making it relatively insensitive to other light, such as the pumping light and background light.

The type of gas, the gas pressure, the length of path of the beam 11 viewed by the detector and the solid angle subtended by the detector may be chosen to provide the scattering of such portion of the light of the laser beam as will fall within the range of the detector. In a typical measuring apparatus utilizing dry air as the scattering medium, a scattered fraction of $10^{-12}$ of the original light beam was directed at the detection means. For a laser beam initially containing $10^{-10}$ watts, which is a typical power level, the power reaching the detection means is only $10^{-2}$ watts, which is a tolerable power level for many phototubes.

The detection means or multiplier phototube 18 is disposed at the end of the arm 17. A virtual slit, or aperture, is formed in the arm 17 to fix the length of the scattering region from which light from the beam 11 is scattered into the arm 17 to reach the detector 18. In this connection, an entrance pupil 45 is disposed in the arm 17 adjacent the main body of the enclosure 14. The entrance pupil 45 functions to pass the scattered light to the central part of an entrance lens 46, while blocking off the outer edges of the lens 46 so as to avoid adverse optical effects which might be produced by the outer edges of the lens 46. The entrance lens 46 focuses the light beam to a point of convergence at an aperture 47 disposed in a field stop 48. The light beam then passes through a variable diaphragm 49 and through an exit lens 50. The exit lens 50 is adapted for providing a light beam having generally parallel rays of light. An exit pupil 51 is disposed adjacent the output of the exit lens 50 so as to reduce any adverse optical effects, resulting from the light beam passing through the outer edges of the exit lens 50. In addition, a suitable narrow band interference filter 52 is disposed intermediate the exit pupil 51 and the phototube 18. It is also generally desirable to dispose a plurality of light baffles 53 similar in design and purpose to the light baffles 44 at predetermined positions along the inner walls of the arm 17.

The detection means or multiplier phototube 18 is preferably stable with a fast response time of less than $5 \times 10^{-9}$ seconds and is relatively linear and highly sensitive to light at the desired wave length. Typical example of such detectors are the photomultiplier tubes RCA type-7102 and RCA type-7326. Such tubes may be quite easily arranged to yield very short response times by insertion of the cathode follower circuit 26 very close to the anode 58 of the multiplier phototube. In addition, vacuum photocells such as the type FW-114 and FW-4000 made by ITT Laboratories, Fort Wayne, Ind., may be used when lower sensitivity is permissible. The particular multiplier phototube selected will depend on the wave length of the light, the degree of sensitivity desired, etc. Both the type 7102 and type 7326 tubes have ten dynodes, although for simplicity only two dynodes 60 are shown in the drawing. Many photomultipliers are capable of extremely short time-resolution. For example, when an input pulse having a duration of one millimicrosecond is supplied to the photocathode 62, a pulse having a time spread of about five millimicroseconds (at 50% of maximum pulse height) appears at the anode 58 across the output resistor 63. A high voltage power supply 64 supplies the necessary voltages to operate the phototube 18. The tube is preferably operated in a slightly fatigued condition for high stability. In addition, the tube should be operated with an average anode current that is well below its recommended maximum.

As previously indicated, in the preferred form of this invention, the output of the phototube 18 is fed to a cathode follower circuit 26 placed very close to the output anode 58. The cathode follower circuit 26 may include a suitable triode 66 having a plate 68 connected to a power supply 70 and having a cathode 72 which is grounded through a load resistor 73. The output of the phototube 18 is connected to control grid 74 of the triode 66. By using the cathode follower 26, high speed response of the phototube 18 is assured. In addition, the load placed on the phototube 18 is minimized. As a result the inherent stability and linearity of the cathode follower 26 permits accurate transfer of the signal from the phototube 18 to the fast amplifier 30 and thence to the oscilloscope 34. The signal as developed on the oscilloscope 34 may be photographed or otherwise recorded or utilized.

The signal thus developed on the oscilloscope 34 is systematically related to the power in the incident light beam 11 and is therefore indicative thereof, thus providing a measure of the power output of the laser 10. In order that the measure be an absolute measure, the apparatus must be calibrated. Empirical methods may be used, as by comparing the measurement with measurements made by other methods, such as calorimetry. It is also possible to calculate, from known scattering properties of the gas and the geometry, the portion of the incident light that is scattered to the detector 18. This light can then be compared with a standard light source to provide the desired calibration. As shown in the drawing, this may be accomplished by disposing another arm 78 of the enclosure 14 normal to the path of the laser beam, and aligned with the arm 17.

The calibration means 39 includes the standard light source 40, which may be calibrated in accordance with the standard of the National Bureau of Standards. The calibration means 39 and the light trap 42 are preferably mounted on the movable generally flat plate 41. Preferably a track 79 having a flat plate-like bottom member 80 and side rails 81 is disposed on the arm 78. The plate 41 is slideably engaged by the track 79 in relatively gastight relationship. Thus, the calibration means 39 and the light trap 42 are conveniently disposed on the arm 78, so that the one may be readily replaced by the other to close the end of the arm 78. In certain instances, where the sliding seal provided by the plate 41 moving on the track 79 is not sufficiently gas-tight, a gas-tight dome or housing (not shown) may be disposed on the plate 41, enclosing the calibration means 39 and the light trap 42 in a substantially gas-tight environment.

The light trap is typically in the form of a cone or V fabricated of dark glass, which has the property of absorbing all entering light without permitting any light to pass through it. Thus, when the calibration process has been completed the light trap 42 is positioned to close the end of the arm 78 and the selectively removable light source 40 is removed from communication with the interior of the arm 78. Suitable light baffles 88 are disposed along the inner surfaces of the arm 78 to preclude any reflection effects from the light from the standard lamp 40, from interfering with the calibration process.

The lamp 40 is supplied with power from a suitable stable source and a predetermined fraction of the light emitted by it may be permitted to radiate in the direction of the photomultiplier 18, which is aligned with the lamp 40. A calibrated absorber 86 passes a known fraction of the light striking it from the lamp 40. The geometry of the apparatus, and more particularly the length of the path traversed by light from the standard lamp 40 to the photomultiplier 18, is known so that the amount of light actually impinging on the photo-cathode of the phototube 18 may be readily calculated by use of the inverse square law, i.e., light intensity varies with the inverse square of the distance separating the light source and the light target. Thus, by suitable adjustment of the calibrated absorber 86 the sensitivity of the phototube 18 and associated circuits may be easily tested, and the measuring apparatus may be calibrated accordingly.

It is preferable to calibrate the apparatus frequently to avoid errors occasioned by changes in the sensitivity of the phototube 18 and the associated measuring circuits. The arrangement shown and described above is particularly suitable for this as it involves merely replacing the light trap 42 by the lamp 40 and noting the signal thereupon developed at the oscilloscope 34.

Any adverse effects on the apparatus due to temperature may be easily eliminated. If the entire system is sealed, an overall change of temperature produces no measurable effect since the scattering coefficient depends primarily on the density of the molecules in the confined enclosure which, of course, does not change with the temperature. If there are temperature differences in various regions of the gas enclosed, there may be substantially different densities in these regions; then it is desirable to keep the temperature within the enclosure uniform rather than constant. For this purpose, it may be desirable to fabricate the apparatus out of a moderately heavy aluminum block surrounded by suitable thermal insulation.

It is sometimes desirable to avoid detection of stray light which may enter the scattering enclosure 14 and to ensure that scattering of the laser beam is caused only by the gas molcules. The primary source of stray light is the "pumping" light from the source used to excite the laser 10. Specifically, the light from the pumping source has a higher total intensity than that of the laser beam, but the light emitted in the direction of the laser beam during the instant of laser emission is of considerably lower intensity than the laser beam. This stray light can be discriminated against by the narrow-band interference filter 52 within the arm 17. The stray light effect may also be reduced by increasing the separation between the laser 10 and the enclosure 14. Such increased separtaion has no effect on the parallel laser beam but reduces the intensity of the pumping light in proportion to the inverse square of the separation distance. Pumping light emitted in directions other than that of the direction of travel of the laser beam is adequately eliminated by the light baffles 44, which serve to preclude stray light from reaching the photomultiplier 18.

Since the laser beam comprises substantially parallel rays, there is substantially no error from the beam hitting the wall of the apparatus. In addition, the first scattering of the beam results in such a small amount of scattered light, that double scattering effects are negligible.

If desired, the enclosure 14 may be employed in the present invention with the windows 15 and 16 being merely openings. Such operation is often desirable when a very high power level laser beam is being measured or when continuous emission from the laser is attained. Under such circumstances the slight absorption of light by the window material may lead to excessive heating. When the windows are mere openings, it is preferable to employ a gas flow system. In this connection filtered gas may be introduced into the apparatus to flow through the scattering region adjacent to the slit 45 and out through the ends of the apparatus. Preferably the velocity of gas flow out through the ends is made sufficiently high so that diffusion of air into the scattering region is negligible. In addition, for high accuracy it is desirable to keep the density of the gas in the scattering region constant to within approximately 2%, since the scattering of the light beam is proportional to the density of the gas through which it passes. This is readily achieved by the use of a suitable aerodynamic design within the enclosure 14 such that turbulence is avoided. Since turbulence within the enclosure 14 would result in variations of gas density in various regions along the path of travel of the light beam, it is desirable to avoid the condition.

It should be understood that various modifications in the structural configuration of the embodiments previously described can be effected by one skilled in the art without deviating from the invention as set forth in the following claims.

What is claimed is:

1. A method for obtaining a measurement of the power in a beam of light emitted by a high intensity source of light comprising directing said beam of light into an enclosure filled with gas having known light scattering properties so as to cause a small fixed proportion of said light to be scattered out of said beam of light, and detecting a predetermined portion of said light so scattered as an indication of the power in the incident beam.

2. A method for obtaining an absolute measurement of the energy in a pulsed beam of light emanating from a laser comprising directing the pulsed beam of light through na enclosure filled with gas having known light scattering properties that scatters a small fixed proportion of said light out of said beam, detecting a predetermined portion of said light so scattered by producing a signal systematically related to the intensity of said scattered light, and integrating said signal to produce an integrated signal indicative of the total output energy contained in a single laser pulse.

3. Apparatus for measuring the power in a beam of light emanating from a light source of high intensity, said apparatus comprising an enclosure having means to admit said beam into the interior thereof, gas having known light scattering properties disposed within said enclosure for scattering a small fixed proportion of the light out of said beam, light detecting means disposed out of said beam and responsive to a predetermined portion of the light scattered out of said beam by producing a signal systematically related to the intensity of said scattered light as an indication of the power in the incident beam.

4. An apparatus for measuring the power in a beam of light emitted by a high intensity source of light comprising an enclosure through which the beam of light may be directed, gas having known light scattering properties disposed within said enclosure for scattering a small fixed proportion of the light out of said beam, light detection means disposed out of the path of said beam and responsive to a predetermined portion of the light scattered out of said beam by producing a signal systematically related to the intenisty of said scattered light, and means for calibrating said light detection means, including a source of light producing a known light intensity at said light detection means.

5. An apparatus for measuring the power in a beam of light emitted by a laser comprising an enclosure through which the beam of light may be directed, gas having known light scattering properties disposed within said enclosure for scattering a small fixed proportion of the light out of said beam, a hollow first arm dipsosed in a directional normal to the path of said light beam and providing optical communication therethrough, a photosensitive device at the end of said arm in optical communication with a predetermined portion of the path of said beam for detecting a predetermined portion of light scattered into said arm by producing a signal systematically related to the intensity of said scattered light, a second arm disposed in a direction normal to said path of said beam and aligned with said first arm, and a lamp producing a known light intensity at said photosensitive device and selectively operable within said second arm for calibrating said photosensitive device.

6. An apparatus for measuring the power in a beam of light emitted by a laser comprising an enclosure through which the beam of light may be directed, gas having known light scattering properties disposed within said enclosure for scattering a small fixed proportion of the light out of said beam, a hollow first arm disposed in a direction normal to the path of said light beam and providing optical communication therethrough, a photosensitive device at the end of said arm in optical communication with a predetermined portion of the path of said beam for detecting a predetermined portion of light scattered into said arm by producing a signal systematically related to the intensity of said scattered light, a second arm disposed in a direction normal to said path of said beam and aligned with said first arm, a movable means disposed on said second arm, said movable means being adapted for movement from a first predetermined position to a second predetermined position, a calibration means including a standard lamp and a calibrated absorber rigidly mounted on said movable means, said calibration means being in optical communication with said first arm when said movable means is in said first predetermined position to provide light of known intensity at said photosensitive device, and a light trap rigidly mounted on said movable means, said light trap being in optical communication with said first arm when said movable means is in said second predetermined position.

7. An apparatus for measuring the output power in a beam of light emitted by a laser comprising an elongated enclosure having windows at oppositely disposed ends thereof for passing said beam of light through said chamber, means within said enclosure for absorbing light entering through one of said windows other than in the direction of the other of said windows, gas having known light scattering properties disposed within said enclosure for scattering a small fixed proportion of the light out of said beam, an arm extending from said enclosure intermediate its ends, means defining a slit providing optical coupling between the path of said beam and said arm, whereby a predetermined portion of the light scattered from the beam is directed into said arm, photosensitive means disposed within said arm and responsive to light from said slit by producing a signal systematically related to the intensity of light from said slit, and means within said arm for absorbing light entering said arm through said slit other than in the direction of said photosensitive means, whereby said signal is indicative of the power of said laser beam.

8. An apparatus for measuring the output power in a beam of light emitted by a laser comprising an elongated enclosure having windows at oppositely disposed ends thereof for passing said beam of light through said chamber, means within said enclosure for absorbing light entering through one of said windows other than in the direction of the other of said windows, gas having known light scattering properties disposed within said enclosure for scattering a small fixed proportion of the light out of said beam, a first arm extending from said enclosure intermediate its ends, means for defining a slit providing optical coupling between the path of said beam and said arm, whereby a predetermined portion of the light scattered from the beam is directed into said arm, photosensitive means disposed within said first arm and responsive to light from said slit by producing a signal systematically related to the intensity thereof, a variable diaphragm disposed within said first arm intermediate said slit and said photosensitive means for controlling the intensity of light directed into said photosensitive means, means within said first arm for absorbing light entering said arm through said slit other than in the direction of the photosensitive means, a second arm extending from said enclosure aligned with said first arm, and a calibration means selectively operable within said second arm, said calibration means including a standard light source and a calibrated absorber intermediate said light source and said enclosure to provide light having a known intensity at said photosensitive means, said calibration means providing a comparison between said signal produced by scattered light from said beam and a signal similarly produced by detection of light from said standard light source, whereby the signal produced by said light scattered from said beam provides an absolute indication of the power in said beam of light.

References Cited

UNITED STATES PATENTS

| | | |
|---|---|---|
| 685,954 | 11/1901 | Tesla. |
| 2,251,973 | 8/1941 | Beale et al. |
| 2,736,813 | 2/1956 | Cherrier _____ 250—218 X |
| 2,877,453 | 3/1959 | Mendenhall. |
| 3,127,464 | 3/1964 | Gustavson. |
| 3,157,789 | 11/1964 | Thomas. |
| 3,170,068 | 2/1965 | Petriw et al. |
| 3,231,748 | 1/1966 | Haessler et al. |
| 3,322,960 | 5/1967 | Geniesse. |
| 3,344,703 | 11/1967 | Milton. |

JEWELL H. PEDERSEN, *Primary Examiner.*

WARREN A. SKUAR, *Assistant Examiner.*

U.S. Cl. X.R.

250—218; 331—94.5

U.S. DEPARTMENT OF COMMERCE

PATENT OFFICE

Washington, D.C. 20231

UNITED STATES PATENT OFFICE
CERTIFICATE OF CORRECTION

Patent No. 3,436,152          April 1, 1969

Dinsdale M. J. Compton et al.

It is certified that error appears in the above identified patent and that said Letters Patent are hereby corrected as shown below:

Column 4, line 45, "$10^{-10}$" should read -- $10^{10}$ --.

Signed and sealed this 7th day of April 1970.

(SEAL)
Attest:

Edward M. Fletcher, Jr.

Attesting Officer

WILLIAM E. SCHUYLER, J

Commissioner of Paten